(12) United States Patent
Moyer

(10) Patent No.: US 8,099,560 B2
(45) Date of Patent: Jan. 17, 2012

(54) SYNCHRONIZATION MECHANISM FOR USE WITH A SNOOP QUEUE

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 512 days.

(21) Appl. No.: 12/201,228

(22) Filed: Aug. 29, 2008

(65) Prior Publication Data

US 2010/0057999 A1    Mar. 4, 2010

(51) Int. Cl.
*G06F 12/08*    (2006.01)

(52) U.S. Cl. ............ 711/146; 711/141; 711/E12.026; 711/E12.033

(58) Field of Classification Search ............ 711/146, 711/141, E12.026, E12.033
See application file for complete search history.

(56) References Cited

U.S. PATENT DOCUMENTS

| | | |
|---|---|---|
| 4,096,571 A | 6/1978 | Vander Mey |
| 5,426,765 A | 6/1995 | Stevens et al. |
| 5,506,971 A | 4/1996 | Gullette et al. |
| 5,652,859 A | 7/1997 | Mulla et al. |
| 5,893,151 A | 4/1999 | Merchant |
| 5,920,892 A | 7/1999 | Nguyen |
| 6,029,204 A | 2/2000 | Arimilli et al. |
| 6,073,212 A | 6/2000 | Hayes et al. |
| 6,175,930 B1 | 1/2001 | Arimilli et al. |
| 6,253,291 B1 | 6/2001 | Pong et al. |
| 6,594,734 B1 | 7/2003 | Kyker et al. |
| 6,668,309 B2 | 12/2003 | Bachand et al. |
| 6,907,502 B2 | 6/2005 | Augsburg et al. |
| 7,818,511 B2 | 10/2010 | Goodman et al. |
| 2003/0005236 A1 | 1/2003 | Arimilli et al. |
| 2006/0004965 A1 | 1/2006 | Tu et al. |
| 2006/0224835 A1 | 10/2006 | Blumrich et al. |

FOREIGN PATENT DOCUMENTS

WO    9932976    7/1999

OTHER PUBLICATIONS

U.S. Appl. No. 11/969,112, filed Jan. 3, 2008.
U.S. Appl. No. 12/053,761, filed Mar. 24, 2008.
U.S. Appl. No. 12/112,796, filed Apr. 30, 2008.
Office Action mailed Jun. 6, 2011 in U.S. Appl. No. 12/201,216.
Office Action mailed Aug. 4, 2011 in U.S. Appl. No. 12/201,225.
Office Action mailed Jul. 5, 2011 in U.S. Appl. No. 12/201,272.

*Primary Examiner* — Yong Choe
(74) *Attorney, Agent, or Firm* — Joanna G. Chiu; Robert L. King

(57) ABSTRACT

In a data processing system each bus master of a plurality of bus masters communicates information via a system interconnect. A cache is associated with a predetermined bus master of the plurality of bus masters for storing information used by the predetermined bus master. A snoop queue is associated with the predetermined bus master for storing a plurality of snoop requests and selectively storing for each snoop request an indicator of a synchronization request that indicates a synchronization operation is to be performed by completing any previously issued snoop requests prior to or concurrently with completion of the synchronization operation. In one form the indicator is a synchronization request indicator flag for each entry in the snoop queue that indicates whether each entry participates in the synchronization operation associated with the synchronization request.

20 Claims, 7 Drawing Sheets

| SNOOP COMMAND | RESPONSE TYPE |
|---|---|
| 00 | NULL – NO OPERATION PERFORMED (RESERVED FOR TEST?) |
| 01 | INV – INVALIDATE MATCHING CACHE ENTRY |
| 10 | SYNC – SYNCHRONIZE SNOOP QUEUE |
| 11 | RESERVED |

*FIG. 4*

| SNOOP RESPONSE | RESPONSE TYPE |
|---|---|
| 000 | NULL – NO OPERATION PERFORMED, OR NO MATCHING CACHE ENTRY |
| 001 | INV – MATCHING CACHE ENTRY WAS INVALIDATED |
| 010 | SYNC – SNOOP QUEUE SYNCHRONIZED |
| 011 | ERROR – ERROR IN PROCESSING A SNOOP INVALIDATION REQUEST DUE TO TAG PARITY ERROR. |
| 1SS | SYNC ERROR – SNOOP QUEUE SYNCHRONIZED BUT WITH ERROR. SS-2-BIT ENCODING OF ERROR. |

*FIG. 5*

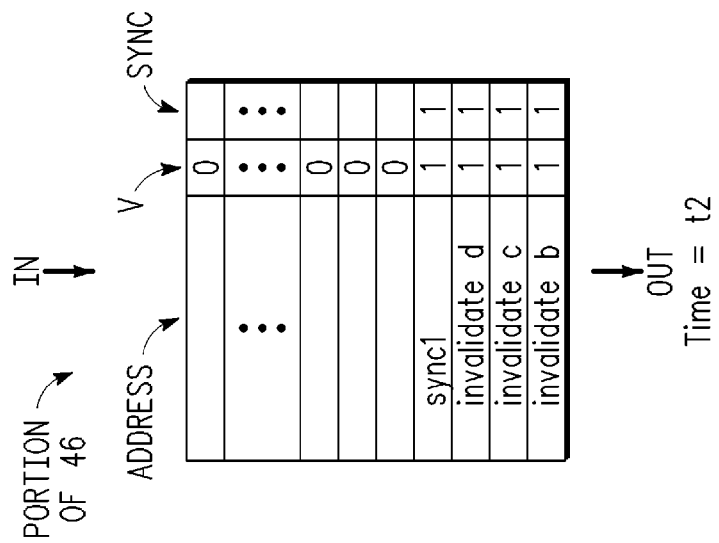
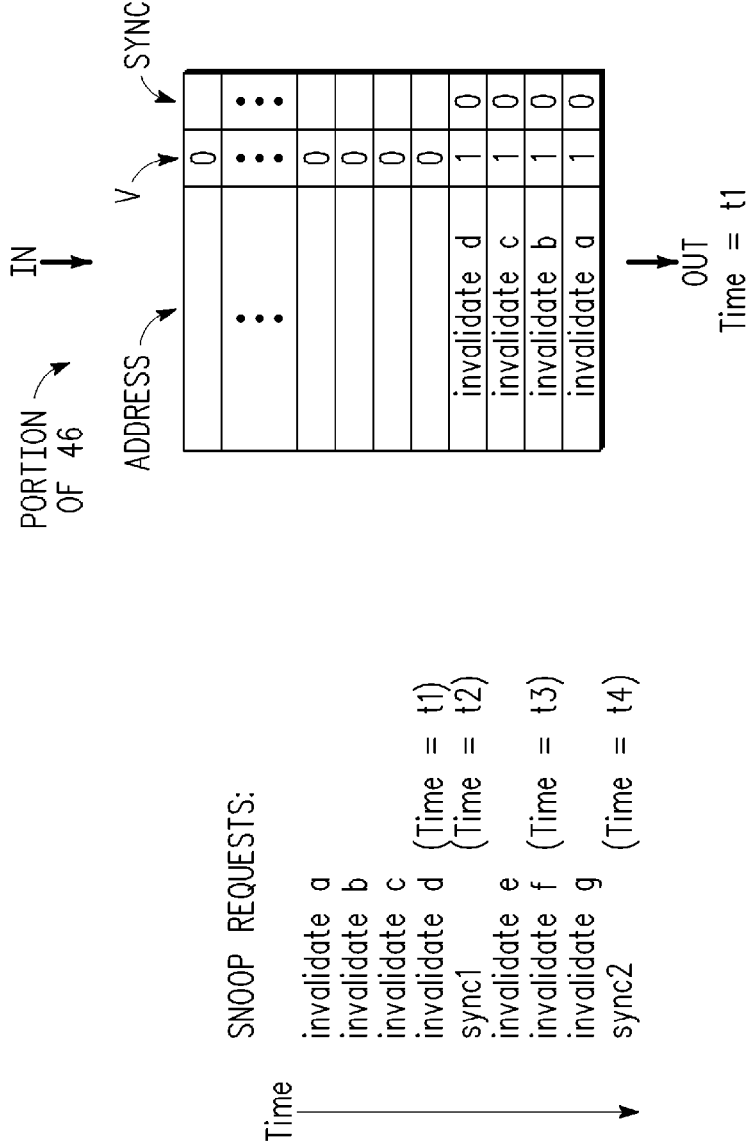

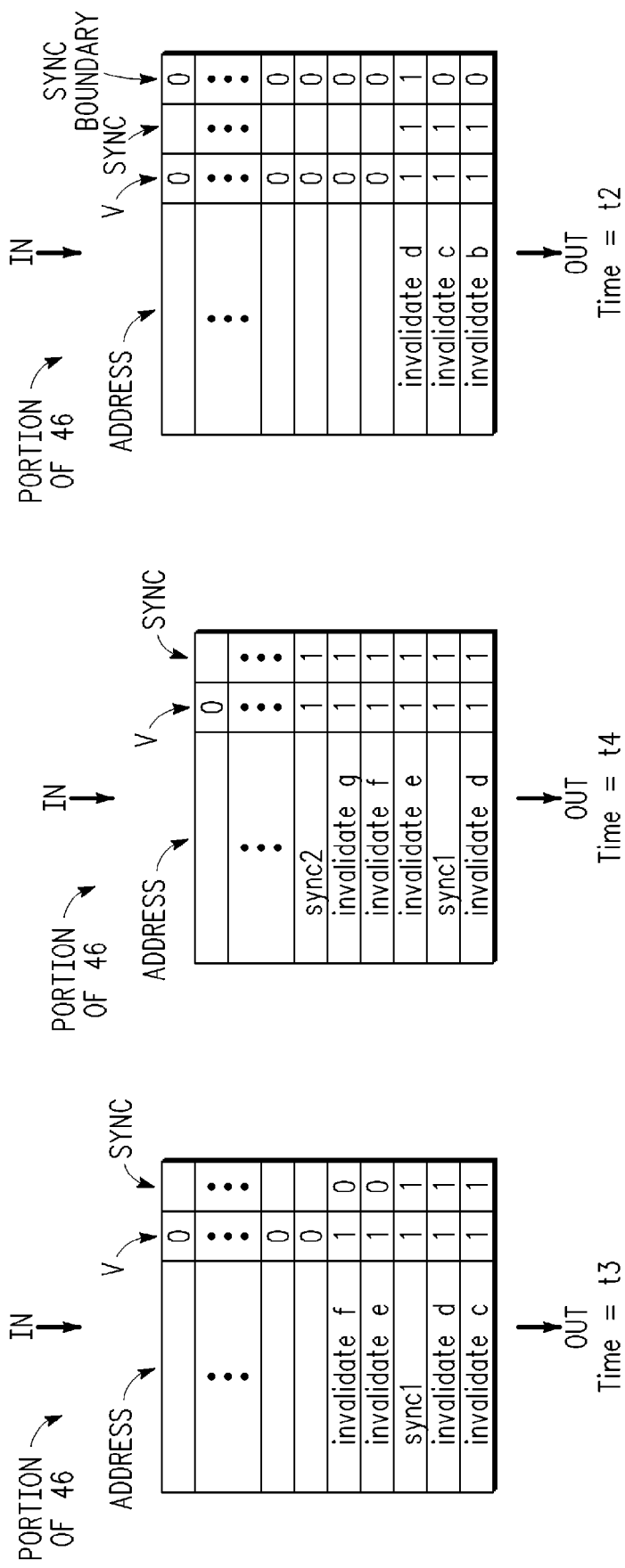

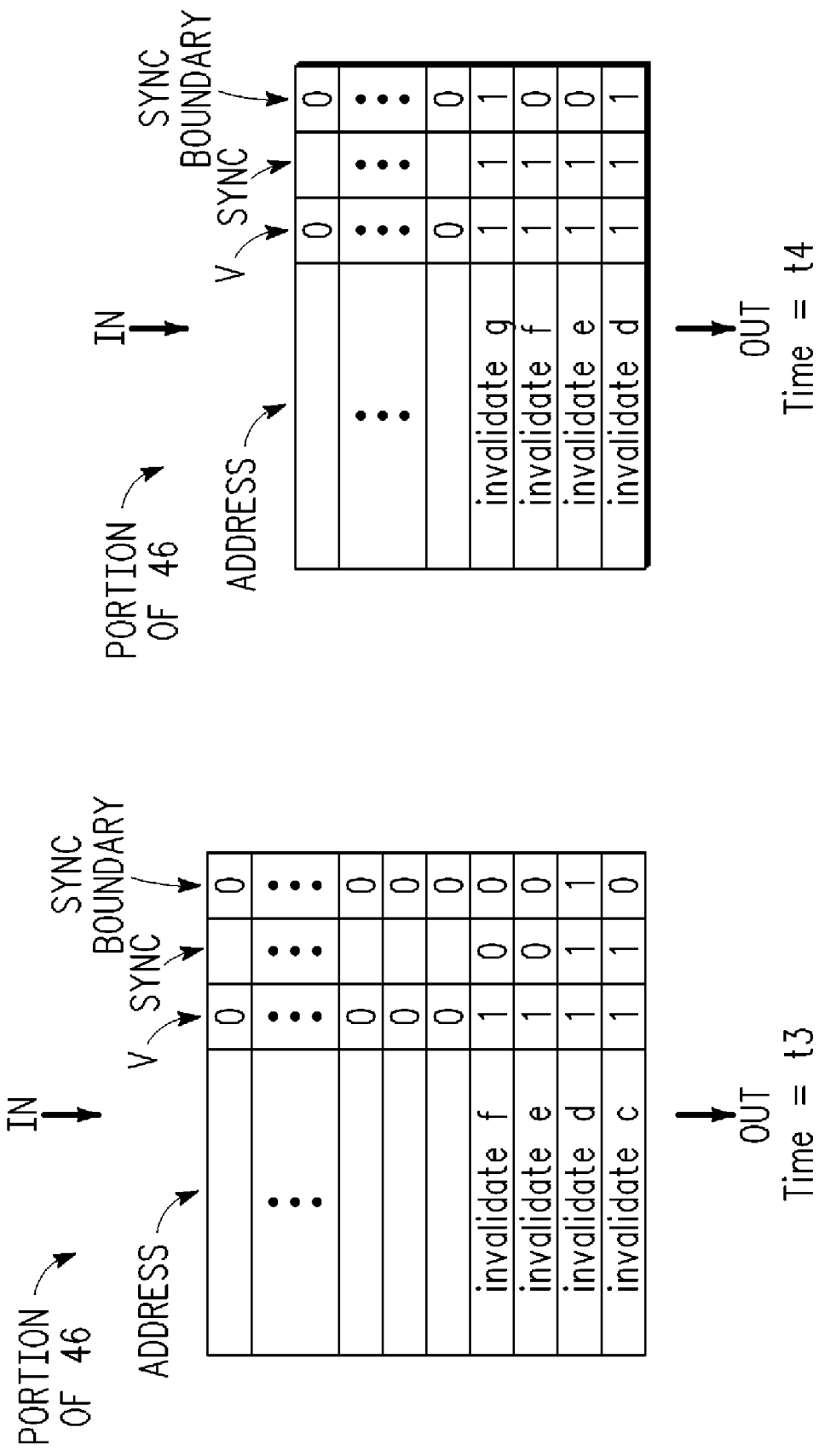

SYNCHRONIZATION MECHANISM FOR USE WITH A SNOOP QUEUE

BACKGROUND

1. Field

This disclosure relates generally to data processing systems, and more specifically, to a synchronization mechanism for use with a snoop queue.

2. Related Art

Some data processing systems use multiple processors with closely coupled cache memories. A cache memory stores a subset of duplicative information that is stored in the system memory. Using a cache in the system may reduce the number of occurrences that a processor must communicate with the system memory via a system interconnect. However, the presence of various caches (or other memory devices) in a system can readily permit a data operand which has the same identifier or address to be present at various locations in the system. When the data operand is modified in one part of the system, an opportunity exists that an old version of the data operand will be stored or used. Memory coherency refers to the need of each processor in a multiple master data processing system to have access to the most recently modified data corresponding to a particular address in the memory system. The presence of differing data values for a same address value in a data processing system may lead to system errors.

To maintain memory coherency, reads and writes of information to the system memory are monitored or "snooped". When either a memory read or a memory write of data at an address is detected, this address of the transaction is used as a snoop address. A snoop request is initiated and directed to all caches in the system such that snoop lookups can be performed to search for any address in the caches that match the snoop address. A snoop hit occurs for every match, and any needed corrective action is taken to maintain coherency of the data at the address in the cache where the snoop hit occurs.

For a processor cache with a single set of tags, arbitration is needed between processor requests to search for addresses in its own cache (such as for performing a load or store instruction whose corresponding access address may be contained in the cache) and snoop requests to perform snoop lookups in the cache. In one arbitration solution used today, any pending snoop request blocks the processor from accessing its cache for one or more cycles. If snoop lookups occur frequently, then processor performance may be negatively impacted. Furthermore, it is typically desirable to provide a mechanism to synchronize a snoop queue in order to support memory ordering point operations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates a table of snoop command encodings in accordance with one embodiment of the present invention;

FIG. 5 illustrates a table of snoop response encodings in accordance with one embodiment of the present invention;

FIG. 6 illustrates a listing of snoop requests with synchronization commands that may be received, over time, by the processor of FIG. 3, in accordance with one embodiment of the present invention;

FIGS. 7-10 illustrate, in diagrammatic form, snapshots of the snoop queue of FIG. 3 at various times during the listing of FIG. 6, in accordance with one embodiment of the present invention; and FIGS. 11-13 illustrate, in diagrammatic form, snapshots of the snoop queue of FIG. 3 at various times during the listing of FIG. 6, in accordance with one embodiment of the present invention.

DETAILED DESCRIPTION

Figure 1:
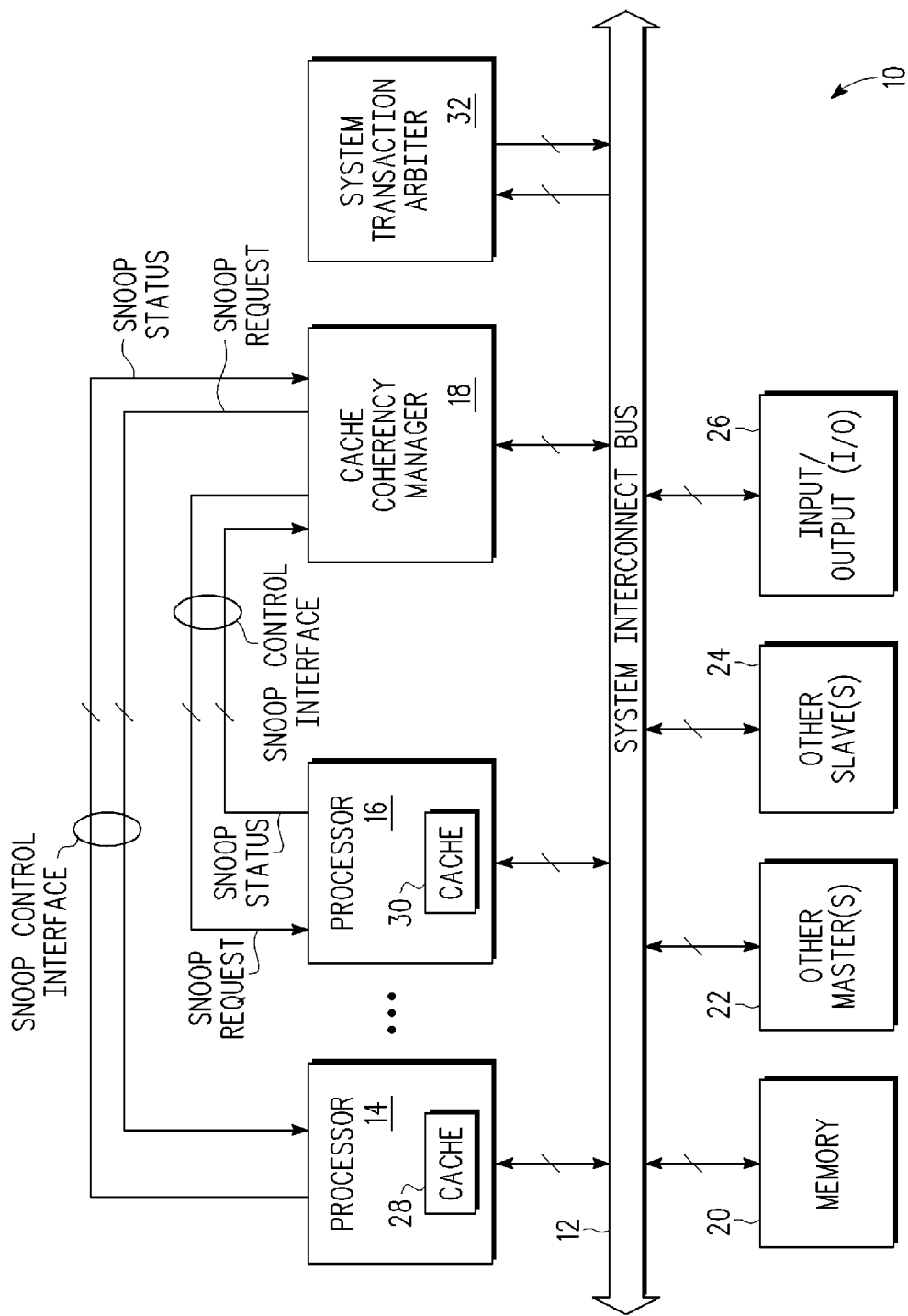
FIG. 1 is a block diagram of a data processing system according to one embodiment of the present invention.

In one embodiment, a snoop queue is used to buffer snoop requests, which may include, for example, non-synchronization (non-sync) type snoop requests and sync type snoop requests. Non-sync type snoop requests, which may include, for example invalidate type snoop requests and flush type snoop requests, are processed in accordance with a "lazy" snoop protocol, in which an immediate snoop lookup is not required when a non-sync type snoop request is received (such as an invalidate type snoop request). Therefore, the non-sync snoop request may be buffered in the snoop queue where an arbiter, which arbitrates between requests to the cache from the processor and from the snoop queue, can prioritize queued snoop requests according to a lazy protocol. In one embodiment of a lazy snoop protocol, snoop requests, which are buffered in a snoop queue, are performed when there is an idle processor cycle available or when a certain snoop queue fullness has been reached. For example, in this embodiment, the arbiter can monitor both processor requests to the cache and a fullness level of the snoop queue to decide when to handle queued snoop requests. Alternatively, other types of lazy snoop protocols may be used. Note also that, as will be described in more detail below, the snoop queue may only buffer non-sync type snoop requests or, alternatively, may buffer all snoop requests, including both non-sync type and sync type snoop requests.

Synchronization controls are provided to provide support for ordering points. For example, a synchronization mechanism may include a synchronization (sync) type snoop request (which may be signaled by a cache coherency manager in response to a processor requesting synchronization), which causes a priority elevation of any pending snoop request in the snoop queue and causes the snoop queue to be flushed to the point at which the sync type snoop request was received. In one embodiment, this is performed through the use of a sync flag which flags existing (i.e. pending) snoop requests in the snoop queue at the time the sync request is received. These sync flags for each entry of the snoop queue force priority elevation for selected queue entries and delineates the boundary between non-sync type snoop requests which occurred prior to the sync type snoop request and non-sync type snoop requests which occur subsequent to the sync type snoop request. Therefore, note that upon receiving a sync request, additional non-sync type snoop requests can be queued behind the sync request, where their corresponding sync flags will indicate that no priority elevation should be forced for these subsequent entries. When the sync type snoop request reaches the head of the snoop queue, a response is provided (such as to the cache coherency manager) to indicate that all snoop queue entries which were present in the snoop queue prior and up to receipt of the sync request have been processed.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in block diagram form, a data processing system 10 according to one embodiment of the present invention. Data processing system 10 includes processor 14, processor 16, cache coherency manager 18, system transaction arbiter 32, system memory 20, other master devices 22, other slave devices 24, and input/output (I/O) devices 26. The devices shown in FIG. 1 are communicatively coupled to a system interconnect 12 but may be coupled by other types of system interconnects in other embodiments. For example, the devices shown may be communicatively coupled by a system interconnect that includes a cross bar switch or other type of switch, or a system interconnect that includes a bus, multiple busses, and/or switches. In one embodiment, a system interconnect may include multiple signal lines for address, data, and control information.

System transaction arbiter 32 arbitrates among various masters of system 10 for transactions on a system interconnect 12. I/O devices 26 may be any number of I/O devices such as keyboard controllers and communications ports. Other slave devices 24 may include memory devices such as a system cache (e.g. L2 cache), or any type of slave device or peripheral. Both devices 24 and 26 may be accessible by transactions on system interconnect 12 that are generated by the master devices of the system (e.g. processor 14, processor 16, or other master devices 22). In one embodiment, other master devices 22 includes other types of processors (e.g. a digital signal processor) or a direct memory access (DMA) device which can generate transactions on system interconnect 12. In one embodiment, each master device may also include a cache (not shown).

In the embodiment shown, system 10 includes a snoop control interface between the cache coherency manager 18 and each of the processors 14 and 16 for exchanging information regarding snooping operations. In the embodiment shown, the snoop control interface includes snoop request lines and snoop status lines. Alternate embodiments may include more or different lines or signals within the snoop control interface. These lines will be discussed below. In the embodiment shown, cache coherency manager 18 only includes snoop control interfaces with processors 14 and 16. However, in other embodiments, cache coherency manager 18 may include a snoop control interface with other devices having a cache (e.g. master devices 22, slave devices 24, and other caches). In alternate embodiments, processors 14 and 16 may include additional caches.

In other embodiments, other types of data systems may include different configurations and/or have additional circuitry. Also, other embodiments may not have all of the circuitry shown in FIG. 1. In one embodiment, some or all of the circuitry shown in FIG. 1 may be implemented on one integrated circuit. However, in other embodiments, system 10 may be implemented with multiple integrated circuits.

In one embodiment, system 10 may be implemented as part of an information system such as e.g. a computer, cell phone, PDA, electronic control circuitry of an automobile, or other type of system implementing a data processing system.

System 10 includes a cache coherency manager 18 (which may also be referred to as cache coherency logic) that snoops system interconnect 12 for transactions and initiates snoop requests for various caches of system 10 (e.g. cache 28, cache 30). In one embodiment, cache coherency manager 18 can send invalidate type snoop requests to determine whether the caches of system 10 include the data operand (e.g. access address) of the transaction such that cache coherency can be maintained. In one embodiment, if a cache contains the data operand, then that cache will invalidate the data operand in response to the invalidate type snoop request. One example of a snoopable transaction is a write transaction by processor 16 to system memory 20 for writing data to a location in memory 20. In response to the transaction, cache coherency manager 18 may generate an invalidate type snoop request to the other caches (e.g. cache 28) to search for data of the same memory address. If a cache has an entry corresponding to the same memory address, then the cache would invalidate that data since an updated version is being provided to memory 20 on system interconnect 12. In an alternate embodiment, in response to the snoopable write transaction, cache coherency manager 18 may generate a flush type snoop request to the other caches, where, if a cache has an entry corresponding to the same address, the cache may respond to the flush type snoop request by sourcing write data from the cache and updating memory 20 with the new data if a matching entry is found. Other types of snoop requests may also be generated by cache coherency manager 18 to caches within system 10 based on one or more specific cache coherency protocols used by the various components of system 10. Such coherency protocols are well known by those skilled in the art, and may include MESI, MOESI, or other protocols and variants thereof. Note also that in alternate embodiments, the circuitry and functionality of cache coherency manager 18 can be distributed among some or all of the masters of system 10 or be located elsewhere in system 10.

In one embodiment, the snoop request signal interface between cache coherency manager 18 and each of processors 14 and 16 includes a request signal line for indicating that a snoop request is being made, a snoop command line indicating a command type to be performed in response to the type of transaction that generated the snoop, a snoop address line which is the address of the transaction being snooped, and a snoop request ID line, which is a value generated by cache coherency manager 18 identifying the snoop request. These signal lines may be multi-bit (either in parallel or serial in some embodiments) or single bit in some embodiments.

FIG. 4 illustrates a table of various snoop command encodings, in accordance with one embodiment, that can be provided via the snoop command line of the snoop request signal interface. In one embodiment, the snoop command is a 2-bit encoding, where a value of 00 indicates a null operation (i.e. indicates that no operation is performed), a value of 01 indicates that an invalidate type snoop request is to be performed in which a matching cache entry is invalidated, a value of 10 indicates a sync type snoop request, and a value of 11 is reserved. In an alternate embodiment, a value of 11 can indicate another type of snoop request, such as, for example, a flush type snoop request. Therefore, as illustrated in FIG. 4, there can be both sync type snoop requests and non-sync type snoop requests (where, in the illustrated embodiment of FIG. 4, the non-sync type snoop requests include only invalidate type snoop requests; however, alternate embodiments may include other non-sync type snoop requests.)

In one embodiment, the snoop status signal interface is used to indicate to cache coherency manager 18 the result of a snoop request. For example, for an invalidate type snoop request, the snoop status can be used to indicate that the invalidate type snoop request has been processed by the cache and the result of the cache snoop (e.g. whether an entry for the data address was found in the cache or not or whether an error (parity or other type) was found with the data of the entry). In another example, for a sync type snoop request, the snoop status can be used to indicate that a sync operation has been completed, and, in one embodiment, to further indicate whether the sync operation completed with or without error. In one embodiment, the snoop status interface includes a snoop response line and a snoop request ID line indicating the ID number of the snoop request. These lines may be multi-bit as well.

FIG. 5 illustrates a table of various snoop response encodings that can be provided via the snoop status signal interface. In one embodiment, the snoop response is a 3-bit encoding, where a value of 000 indicates that no operation was performed or that no matching entry in the cache was found, a value of 001 indicates that a matching cache entry was invalidated in response to an invalidate type snoop request, a value of 010 indicates that the snoop queue has been synchronized in response to a sync type snoop request, and a value of 011 indicates that an error in processing an invalidate type snoop request has occurred due to a TAG parity error (within cache 28). Also, in the illustrated embodiment, a value of 1SS indicates a sync error occurred in response to a sync type snoop request, where the 2-bit field SS can be used to provide a 2-bit encoding of the type of error. Based on a 2-bit encoding, the type of error can be identified as a TAG error (i.e. an address tag error), a decoding error, a multiple cache hit error, a data error, etc. Alternatively, the SS may not be used and the type of error may not be explicitly identified. Alternate embodiments may use alternate encodings for the commands and responses of FIGS. 4 and 5.

Figure 2:
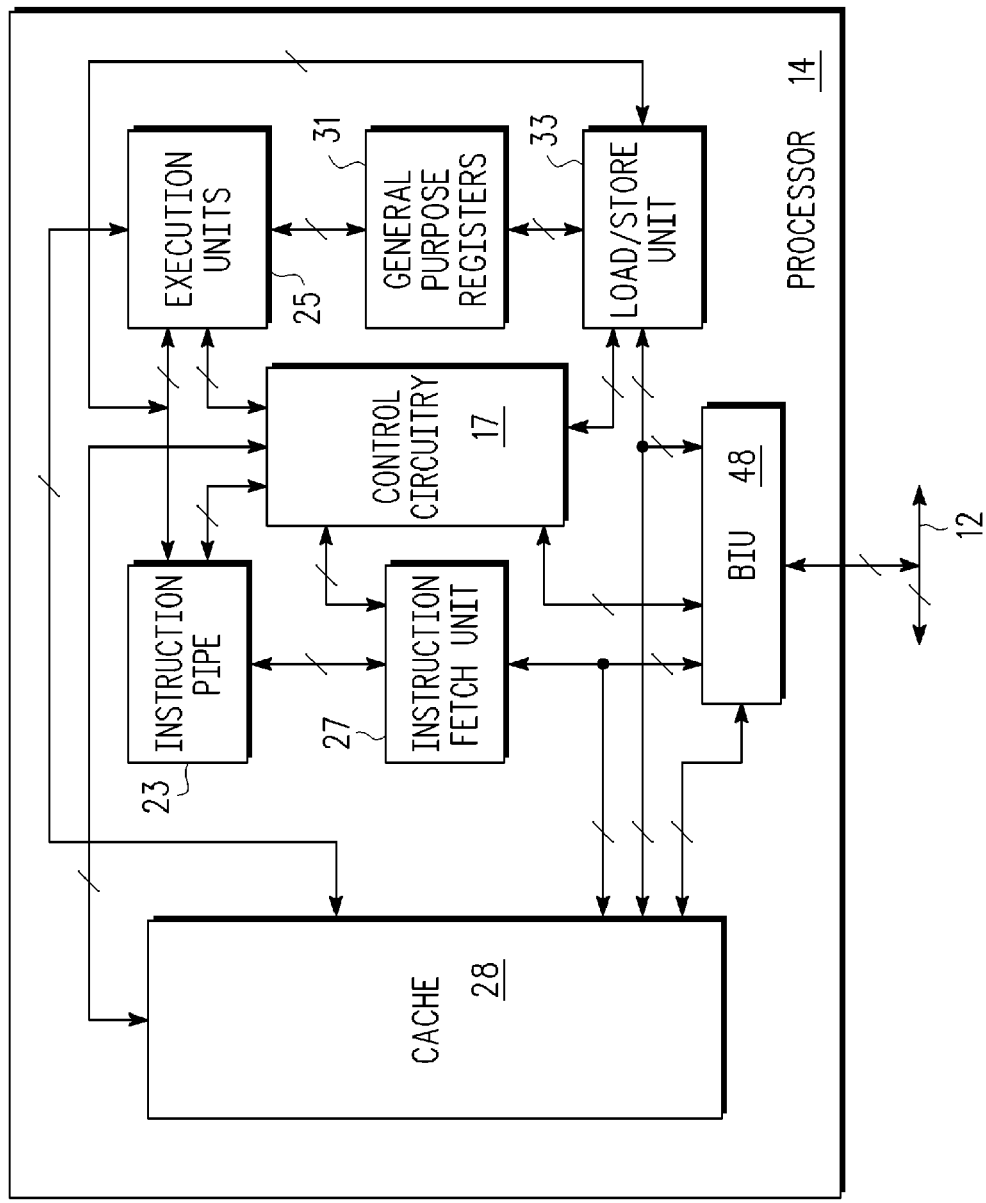
FIG. 2 is a block diagram of one embodiment of a portion of a processor according to one embodiment of the present invention.

Illustrated in FIG. 2 is a portion of processor 14 which further details the control circuitry within processor 14 between cache 28 and a bus interface unit (BIU) 48. Elements which are common with those of FIG. 1 are numbered the same in FIG. 2. BIU 48 is connected to system interconnect 12 and to cache 28 as previously described. A second input/output terminal of BIU 48 is connected to a fifth input/output terminal of cache 28 and to a first input/output terminal of instruction fetch unit 27. A third input/output terminal of BIU 48 is connected to a first input/output terminal of control circuitry 17. A fourth input/output terminal of BIU 48 is connected to a sixth input/output terminal of cache 28 and to a first input/output terminal of a load/store unit 33. A second input/output terminal of the instruction fetch unit 27 is connected to a first input/output terminal of an instruction pipe or instruction pipeline 23. A second input/output terminal of instruction pipeline 23 is connected to a first input/output terminal of execution units 25. Execution units 25 generally include units such as a floating point unit, an integer unit and other processing units. A third input/output terminal of instruction pipeline 23 is connected to a second input/output terminal of control circuitry 17. A third input/output terminal of instruction fetch unit 27 is connected to a third input/output terminal of control circuitry 17. A fourth input/output terminal of cache 28 is connected to a fourth input/output terminal of control circuitry 17. A fifth input/output terminal of control circuitry 17 is connected to a second input/output terminal of execution units 25. A third input/output terminal of execution units 25 is connected to the second input/output terminal of cache 28. A fourth input/output terminal of execution units 25 is connected to a first input/output terminal of general purpose registers (GPRs) 31. A second input/output terminal of general purpose registers 31 is connected to a second input/output terminal of load/store unit 33. A third input/output terminal of load/store unit 33 is connected to the second input/output terminal of instruction pipeline 23 and to the first input/output terminal of execution units 25. A fourth input/output terminal of load/store unit 33 is connected to a sixth input/output terminal of control circuitry 17.

In operation, control circuitry 17 of processor 14 functions to control and coordinate BIU 48 and cache 28 operations as well as the instruction fetch, decode and various execution units of processor 14. Under control of control circuitry 17, instructions are coupled via BIU 48 or cache 28 into the instruction fetch unit 27 and placed in the instruction pipeline 23. The instructions are executed by execution units 25 and results are stored off in GPRs 31. Load/store unit 33 operates under control of control circuitry 17 to load information needed for processing by execution units 25 and to store information from GPRs 31 to/from cache 28 and/or system interconnect 12. Therefore, the portion of processor 14 detailed in FIG. 2 illustrates the instruction execution operation of processor 14 separate from the cache coherency management function.

Figure 3:
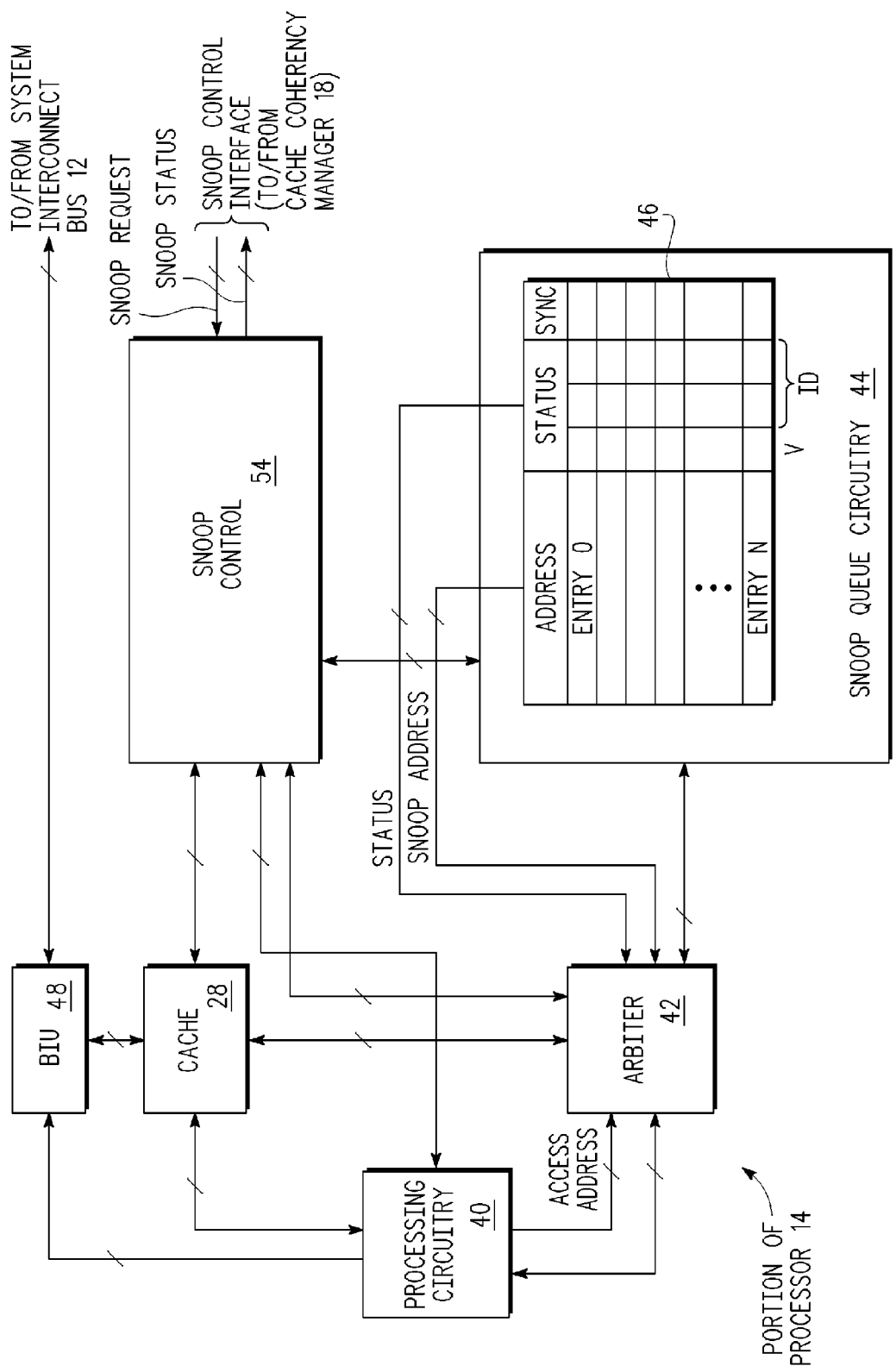
FIG. 3 is a block diagram of a portion of a processor according to one embodiment of the present invention.

Illustrated in FIG. 3 is further detail of a portion of processor 14 which further details cache 28 and associated cache snooping circuitry, in accordance with one embodiment of the present invention. Reference elements illustrated in FIG. 3 that are common with reference elements of FIGS. 1 and 2 are numbered the same. BIU 48 has a first input/output terminal connected via a bidirectional multiple-bit conductor to system interconnect 12. Processing circuitry 40 of processor 14 has a first output that is connected to an input of BIU 48. A second input/output terminal of BIU 48 is connected to a first input/output terminal of cache 28. A second input/output terminal of cache 28 is connected via a bidirectional multiple-bit conductor to a first input/output terminal of processing circuitry 40. A third input/output terminal of cache 28 is connected via a bidirectional multiple-bit conductor to a first input/output terminal of an arbiter 42. A fourth input/output terminal of cache 28 is connected to a first input/output terminal of snoop control 54. A second output of processing circuitry 40 is connected to a first input of arbiter 42 for providing an access address. A second input/output terminal of processing circuitry 40 is connected to a second input/output terminal of arbiter 42. Snoop control 54 has a second input/output terminal connected to a third input/output terminal of the arbiter 42. A third input/output terminal of snoop control 54 is connected to a third input/output terminal of processing circuitry 40. An output of snoop control 54 provides a snoop status signal, and an input of snoop control 54 receives a snoop request signal, both of which may be considered part of the snoop control interface. Snoop queue circuitry 44 has a first output connected to a second input of arbiter 42 for providing a snoop address from the stored (N+1) entries. A second output of snoop queue circuitry 44 is connected to a third input of the arbiter 42 for providing status information associated with each snoop address. This status information may be provided to indicate that the current snoop address is valid and that a request for snoop lookup to arbiter 42 is valid. A fourth input/output terminal of the arbiter 42 is connected to a first input/output terminal of snoop queue circuitry 44 for providing access control. This access control is used to handshake snoop requests and snoop grants and coordinates the operation of the snoop queue circuitry 44. A fourth input/output terminal of snoop control 54 is connected to a second input/output terminal of snoop queue circuitry 44 for providing snoop addresses from cache coherency manager 18 to the snoop queue circuitry 44.

Processing circuitry 40 may include circuitry typically found in a processor such as e.g. an instruction pipe unit, execution units, an instruction fetch unit, control circuitry, general purpose registers, a load store unit, and a prefetch unit. For example, in one embodiment, processing circuitry 40 may include instruction pipe 23, instruction fetch unit 27, control circuitry 17, execution units 25, GPRs 31, and load/store unit 33, of FIG. 2. Processors of other embodiments may include other types of circuitry.

In one embodiment, during processor operations, processing circuitry 40 executes instructions that generate requests for data to be read from system memory 20 (or other slave or I/O devices) and for data to be written to system memory 20 (or other slave or I/O devices). In response to a request for data having a system memory address (e.g. generated by load/store unit 33 or instruction fetch unit 27) processing circuitry 40 will check cache 28 (via arbiter 42) to see if it has any data that corresponds to that system memory address. If not, instruction fetch unit 27 or load/store unit 33 (as appropriate for the type of request) of processing circuitry 40 may generate via BIU 48 a transaction on system interconnect 12 to request data from memory 20 at that system address. In response to the read transaction, the system memory 20 will provide the requested data on system interconnect 12 to processor 14 where BIU 48 receives the data and provides the data to processing circuitry 40 and to cache 28 in some embodiments. After receiving the data by processor 14, the transaction is complete. Write transactions to memory 20 can be initiated by processor 14 where a write address and data are provided on interconnect 12 to be written to memory 20 at the address. Also, data may be written to or read from other slave devices 24 and I/O devices 26 of data processing system 10 in other embodiments. Writes may also update cache 28 from load/store unit 33.

Cache 28 may be an instruction cache, a data cache, or a combination of the two. The use of the term "data" herein in regards to a transaction may refer to the information stored in either an instruction cache or a data cache.

Processor 14 also includes circuitry for snoop request management. The snoop request circuitry operates to keep the data in cache 28 coherent with other copies of the data stored in memory 20 and other caches of data processing system 10. Snoop control 54 receives snoop requests (including both sync type and non-sync type snoop requests, as discussed above) from cache coherency manager 18 via the snoop control interface. Note that the snoop command portion can be used to provide information as to the type of snoop request, as described in reference to the encodings of FIG. 4. Processor 14 includes snoop queue circuitry 44 including snoop queue 46 for storing snoop requests received from the snoop control interface. In one embodiment, a subset of snoop request types are stored in snoop queue 46, such as non-sync type snoop requests (including invalidate type snoop requests), where sync-type snoop requests are not stored in snoop queue 46. Alternatively, both non-sync type snoop requests and sync type snoop requests are stored in snoop queue 46. In one embodiment, snoop request queue 46 may be implemented as a first-in first-out buffer (FIFO). In one embodiment, the FIFO may be implemented as a circular buffer.

Within snoop request queue 46 is a plurality of entries (e.g. N+1 entries, where N is an integer). Each entry in snoop request queue 46 has an address field, a status field that includes status information, and a sync flag field. The address field stores the address of the transaction for which a snoop request was generated. In the embodiment shown, a first status bit is a valid (V) bit (also referred to as a valid flag) which indicates whether the entry in snoop request queue 46 is valid. Other types of status bits may be included in other embodiments. In one embodiment, each entry also includes a snoop request ID field that stores the snoop request ID for the snoop request generated by the cache coherency manager. In one embodiment, each entry also includes a sync flag field (also referred to as a sync request indicator flag) which indicates whether each entry participates in a synchronization operation associated with a synchronization request (i.e. with a sync-type snoop request). Also, in one embodiment, described below in reference to FIGS. 11-13, each entry may also include a sync boundary field (not shown in FIG. 3, but shown in FIGS. 11-13).

In operation, snoop control 54 and snoop queue circuitry 44 operate to keep cache 28 coherent with other copies of the information in system 10. Snoop control 54 receives a snoop request from cache coherency manager 18 via the snoop control interface and, based on the type of snoop request, as can be determined from the snoop command received via the snoop request line, provides the appropriate information to snoop queue circuitry 44. For example, in the case of a non-sync type snoop request, such as an invalidate type snoop request, snoop control 54 provides the address of the snoop request, along with the request ID to be stored in snoop request queue 46. In one embodiment, in the case of sync type snoop requests, snoop control 54 provides a null address for the snoop request, along with the request ID to be stored in snoop request queue 46. In an alternate embodiment, sync type snoop requests are not stored in snoop request queue 46. Snoop queue circuitry 44, upon receiving indication of a sync type snoop request from snoop control 54, regardless of whether or not the received sync type snoop request is stored in snoop request queue 46, asserts the synchronization request indicator flag (i.e. the sync flag) for each valid entry in snoop queue 46 at the time the sync type snoop request is received. Therefore, any snoop requests which were previously received and stored in the snoop queue has its corresponding sync flag asserted to indicate that it will participate in the synchronization operation associated with the received sync type snoop request.

In one embodiment, the snoop addresses are processed and removed from the snoop request queue 46 on a first-in, first-out (FIFO) basis. When a snoop address corresponding to an invalidate type snoop request is present in snoop request queue 46, snoop queue circuitry 44 signals arbiter 42 to request arbiter 42 to arbitrate for access to cache 28. In one embodiment, cache 28 has a single set of address tags and therefore must be either be dedicated to the processor (i.e. processing circuitry 40) for addressing or to snoop queue circuitry 44 for addressing. When arbiter 42 prevents access by processing circuitry 40 to cache 28, snoop addresses from circuitry 44 are routed through arbiter 42 to cache 28. Circuitry within cache 28 performs a snoop look-up operation. The snoop-lookup operation for invalidate type snoop requests includes comparing the snoop address with all the addresses presently stored in cache 28. If a match occurs, the matching entry in cache 28 is marked as invalid since it is potentially different from the entry of the transaction on system interconnect 12. If no match occurs, no further action is taken within cache 28. The hit determination, and the invalidating of the matching entry if a hit does occur may also be referred to as part of the snoop look-up operation. In some embodiments, snoop control 54 may signal arbiter 42 to arbitrate for access to cache 28. In other examples, such as for flush type snoop requests, alternate coherency operations other than invalidation of a matching cache entry on a snoop lookup may occur, such as changing the state of a matching cache entry, or updating a matching cache entry with the latest data, or flushing the matching cache entry out to system interconnect 12 for storage in memory 20, or other caches within system 10.

Therefore, arbiter 42 arbitrates access to cache 28 between access addresses from processing circuitry 40 and snoop addresses from snoop queue circuitry 44. In one embodiment, processing circuitry 40 may signal to arbiter 42 for the need to access cache 28 by simply providing an access address to arbiter 42, which operates as a processing circuitry request for access to cache 28. Alternatively, a separate processing circuitry request signal may be provided from processing circuitry 40 to arbiter 42 to request access to cache 28 for a current access address. Similarly, in one embodiment, snoop queue circuitry 44 may signal to arbiter 42 for the need to access cache 28 by simply providing a snoop address to arbiter 42. Alternatively, a separate snoop circuitry access request signal may be provided from snoop queue circuitry 44 to arbiter 42 to request access to cache 28 for a current snoop address corresponding to a next snoop request in snoop request queue 46.

In one embodiment, arbiter 42 implements a lazy snoop protocol in which a snoop look-up operation need not be immediately performed upon arbiter 42 receiving notice that there is a pending snoop request. Arbiter 42 may, according to a lazy protocol, grant priority to processing circuitry 40 even with pending snoop requests present in snoop queue 46. For example, in one embodiment, arbiter 42 can monitor both processor requests to the cache and a fullness level of the snoop queue to decide when to handle queued snoop requests. In this example, arbiter 42 can grant priority to pending snoop requests when processing circuitry 40 does not have a pending access address (it is an idle request cycle) or when a fullness of queue 46 has exceeded a fullness threshold. Alternatively, other types of arbitration protocols may be used.

After cache 28 performs a snoop look-up operation, cache 28 may provide the results of the operation to snoop control 54 which may then report the results back to cache coherency manager 18 via the snoop status line (such as, for example, using the encodings described above in reference to FIG. 5).

In the case in which sync type snoop requests are also stored in snoop request queue 46, arbiter 42 need not provide the snoop address of these requests to cache 28 since no snoop look-up operation in cache 28 is performed in response to a sync-type snoop request. Instead, at the point the sync-type snoop request reaches its turn to be processed in the snoop queue (reaches the head of the queue), either snoop queue circuitry 44 or arbiter 42 may provide indication to snoop control 54 that a sync-type snoop request has been reached and thus, all previous non-sync type snoop requests present in snoop request queue 46 prior to the sync-type snoop request have been completed. Snoop control 54 may then report back to cache coherency manager 18, via the snoop status line, completion of the sync operation corresponding to the sync-type snoop request and whether the sync operation was completed with or without error (using, for example, the encodings of FIG. 5). In one embodiment, in the case in which sync type snoop requests are not stored in the snoop request queue, the sync flags, as well as a sync boundary indicator present for each entry in snoop request queue 46, can be used by either snoop queue circuitry 44 or arbiter 42 to indicate that a sync point has been reached (similar to a sync-type snoop request reaching the head of snoop request queue 46, had it been stored there) and to signal completion of the sync operation. This embodiment in which sync type snoop requests are not explicitly stored in snoop request queue 46 will be described in more detail below in reference to FIGS. 11-13. Note that this embodiment avoids the need to utilize an entry in snoop queue 46 to store the synchronization request (i.e. the sync type snoop request).

In one embodiment, upon snoop control 54 providing indication of a sync type snoop request to snoop queue circuitry 44, the priority of those non-sync type snoop requests already in existence in snoop queue 46 upon receipt of the sync type snoop request are elevated to a higher priority by arbiter 42 than their previous priority status. For example, in the case of a lazy snoop protocol in which arbiter 42 may be granting accesses to pending access addresses from processing circuitry 40 rather than to snoop addresses from snoop queue 46, upon the priority elevation of the previous non-sync type snoop requests, the priority of the next entry of snoop queue 46 to be processed (e.g. the pending snoop address currently being provided to arbiter 42) is elevated such that its priority is greater than the priority of a pending access address form processing circuitry 40 (i.e. from the predetermined bus master). In this manner, the next snoop address is provided to cache 28 by arbiter 42, even though the snoop protocol may indicate that the access address from processing circuitry 40 should be granted priority. Therefore, in one embodiment, arbiter 42 elevates the priority of servicing the next entry of the snoop queue to be processed (i.e. the head of snoop queue 46) to be greater than a priority of processing circuitry 40 (a predetermined bus master) in response to the sync flag of that next entry of the snoop queue to be processed (i.e. of the head of snoop queue 46) having a first value (e.g. being asserted) indicating that that next entry of the snoop queue is to participate in the synchronization operation associated with a previously received sync type snoop request. However, if the sync flag of that next entry of the snoop queue to be processed has a second value, then its priority is not elevated since it is not to participate in a synchronization operation. Examples will be described in reference to FIGS. 6-13 below.

FIG. 6 illustrates an example listing of snoop requests which may be received by snoop control 54 from cache coherency manager 18. In the example of FIG. 6, each of "invalidate a" through "invalidate g" refer to invalidate type (non-sync type) snoop requests received in that order (with "invalidate b" being received after "invalidate a", and "invalidate c" being received after "invalidate b", etc.). Sync1 and sync2 refer to two different sync-type snoop requests with sync1 being received after "invalidate d" and prior to "invalidate e" and sync2 being received after "invalidate g". Therefore, in FIG. 6, note that "invalidate d" is received at a time t1, sync1 received at a time t2, "invalidate f" received at a time t3, and sync2 received at a time t4, where t1 occurs first in time, followed by t2, then t3, and then t4.

FIG. 7 illustrates a portion of snoop request queue 46 at time t1. Note that the head of queue 46 is the bottom entry of FIG. 7, where new requests are received via the "IN" and a next snoop request to be removed (e.g. provided to arbiter 42) is taken from the head of the queue via the "OUT". Therefore, "invalidate a" is at the head of queue 46 and would be the next snoop request to be removed from queue 46. The description of the head of queue 46 and the "IN" and "OUT" apply to each of FIGS. 8-13 as well, where the head of queue 46 is the bottom entry in each Figure. In FIG. 7, snoop control 54 provided the appropriate information to snoop queue circuitry 44 for storage of "invalidate a" through "invalidate d" into snoop queue 46. Therefore, an entry in snoop queue 46 stores, for example, a snoop address corresponding to "invalidate a" in the address portion of the entry. Also, note that a snoop ID corresponding to "invalidate a" may also be stored in an ID portion of the entry (where the ID portions of the entries are not shown in FIGS. 7-13 for simplicity of description). Each time a snoop request is stored in queue 46, its valid flag (V) is also asserted (indicated as a logic level 1 in the examples of FIGS. 7-13); therefore the valid portion (V) of the entry for "invalidate a" is set to a logic level 1. A subsequent entry corresponds to "invalidate b", a next subsequent entry corresponds to "invalidate c", and a next subsequent entry corresponds to "invalidate d", and the valid flags for each of these entries is asserted to indicate a valid snoop request is stored in the corresponding entry.

At time t1, a sync type snoop request has not yet been received, therefore, the sync flags for each entry is negated (set to a logic level 0 in these examples). These negated sync flags indicate that, as of yet, these entries are not participating in a synchronization operation and that their priority has not been elevated or otherwise adjusted due to a synchronization operation.

FIG. 8 illustrates a portion of snoop request queue 46 at time t2. By time t2, note that "invalidate a" has been removed from the head of queue 46 to be processed (i.e. provided to cache 28 by arbiter 42). Therefore, "invalidate b" is now the head of queue 46. At time t2, sync1 is received, and is stored in a subsequent entry of queue 46, following the entry corresponding to "invalidate d". Note that in the examples discussed in reference to FIGS. 8-10, it is assumed that sync type snoop requests, as well as non-sync type snoop requests, are stored in queue 46. Since a sync type snoop request was provided by snoop control 54 to snoop queue circuitry 44, the sync flag of the sync request entry as well as the sync flag of all entries currently in existence in queue 46 at time t2 are asserted (set to a logic level one in this example). Therefore, all snoop requests in queue 46 which are stored in queue 46 upon receipt of sync1 have their sync flags asserted to indicate that they are participating in the sync operation initiated by sync1. Therefore, when sync 1 reaches the head of queue 46, snoop control 54 can notify cache coherency manager 18 that the sync operation has been completed, indicating that each of the requests in queue 46 prior to sync1 which participated in the sync operation (e.g. "invalidate a" through "invalidate d" have been completed. Snoop control 54 can then acknowledge completion of the sync1 request to cache coherency manager 18 using the encodings of FIG. 5. Note also, that in one embodiment, upon asserting the sync flags of these entries, the priority of these entries is elevated such that they are each, in turn, as they reach the head of queue 46, granted priority by arbiter 42 to access cache 28, even if there are pending access addresses from processing circuitry 40.

FIG. 9 illustrates a portion of snoop request queue 46 at time t3. By time t3, note that "invalidate b" has been removed from the head of queue 46 to be processed (i.e. provided to cache 28 by arbiter 42). Therefore, "invalidate c" is now the head of queue 46. Also, prior to t3, "invalidate e" was received and stored in queue 46 in the entry following the entry corresponding to sync 1. At time t3, "invalidate f" is received and is stored in a subsequent entry of queue 46, following the entry corresponding to "invalidate e". Each of the entries corresponding to "invalidate e" and "invalidate f" have their valid flags asserted, but their sync flags negated. That is, queue 46 can continue to receive and store snoop requests prior to completion of a previous synchronization request (such as sync1). However, the sync flags of these subsequently received non-sync type snoop requests are not asserted to indicate participation in a synchronization operation.

FIG. 10 illustrates a portion of snoop request queue 46 at time t4. By time t4, note that "invalidate c" has been removed from the head of queue 46 to be processed (i.e. provided to cache 28 by arbiter 42). Therefore, "invalidate d" is now the head of queue 46. Also, prior to t4, "invalidate g" was received and stored in queue 46 in the entry following the entry corresponding to sync 1. At time t4, sync2 is received and is stored in a subsequent entry of queue 46, following the entry corresponding to "invalidate g". The entries corresponding to "invalidate g" and sync2 each have their valid flags asserted. Upon receipt of sync2, the sync flag of the entry for sync2 as well as the sync flag of all entries currently in existence in queue 46 at time t4 (which are not yet asserted) are asserted (set to a logic level one in this example). Therefore, all snoop requests in queue 46 which were received prior to sync2 have their sync flags asserted to indicate that they are participating in a sync operation. Note that the sync flags of "invalidate e" through "invalidate g" are set to indicate they are participating in a sync operation (for sync2). The sync flag of "invalidate d" remains asserted as well to indicate that it is also participating in a sync operation (for sync1). Therefore, when sync1 reaches the head of queue 46, snoop control 54 can notify cache coherency manager 18 that the sync operation corresponding to sync1 has been completed, indicating that each of the requests in queue 46 prior to sync1 which participated in the sync operation (e.g. "invalidate a" through "invalidate d") have been completed. Additionally, when sync2 reaches the head of queue 46, snoop control 54 can notify cache coherency manager 18 that the sync operation corresponding to sync2 has been completed, indicating that each of the requests in queue 46 prior to sync2 (and any previous sync request) which participated in the sync operation (e.g. "invalidate e" through "invalidate f") have been completed. Note also, that in one embodiment, upon asserting the sync flags of these entries, the priority of these entries is elevated such that they are each, in turn, as they reach the head of queue 46, granted priority by arbiter 42 to access cache 28, even if there are pending access addresses from processing circuitry 40.

FIGS. 11-13 provide examples of how the snoop requests of FIG. 6 appear in queue 46 when sync type snoop requests are not stored in snoop queue 46. For this embodiment, note that snoop request queue may include an additional field for each entry referred to as a sync boundary field or sync boundary flag. The addition of this sync boundary field to queue 46 allows for the conservation of snoop queue entries since the entries of snoop queue 46 need not be utilized for sync type snoop requests.

FIG. 11 illustrates a portion of snoop request queue 46 at time t2. Note that, for each entry in queue 46 prior to time t2 ("invalidate a" through "invalidate d"), the valid flags were asserted (set to a logic level one in this example), the sync flags were negated (set to a logic level zero in this example, indicating that they are not as of yet participating in a synchronization operation), and the sync boundary flags are negated (set to a logic level zero). Also, by time t2, note that "invalidate a" (which was stored into queue 46 when it was received earlier) had been removed from the head of queue 46 to be processed (i.e. provided to cache 28 by arbiter 42). Therefore, "invalidate b" is now the head of queue 46, as was the case in FIG. 8. At time t2, sync1 is received. However, sync1 is not stored in queue 46, unlike the example of FIG. 8. Instead, the sync boundary flag of the most recently queued snoop request ("invalidate d") is asserted (set to a logic level one) at the time sync1 is received. Also, the sync flag of all entries currently in existence in queue 46 at time t2 are asserted (set to a logic level one in this example). Therefore, all snoop requests in queue 46 which were received prior to sync1 have their sync flags asserted (as illustrated in FIG. 11) to indicate that they are participating in the sync operation initiated by sync1. Note also, that in one embodiment, upon asserting the sync flags of these entries, the priority of these entries is elevated such that they are each, in turn, as they reach the head of queue 46, granted priority by arbiter 42 to access cache 28, even if there are pending access addresses from processing circuitry 40.

Therefore, when arbiter 42 grants priority to "invalidate d" to access cache 28 after processing snoop requests for "invalidate b" and "invalidate c", it can see that its sync boundary field is asserted, indicating that the processing of this current snoop request ("invalidate d") also indicates the completion of a sync operation (corresponding to sync1). Therefore, arbiter 42 (or snoop queue circuitry 44) can notify cache coherency manager 18 that the sync operation has been completed, indicating that each of the requests in queue 46 prior to sync1 which participated in the sync operation (e.g. "invalidate a" through "invalidate d") have been completed. Snoop control 54 can then acknowledge completion of the sync1 request to cache coherency manager 18 using the encodings of FIG. 5.

FIG. 12 illustrates a portion of snoop request queue 46 at time t3. By time t3, note that "invalidate b" has been removed from the head of queue 46 to be processed (i.e. provided to cache 28 by arbiter 42). Therefore, "invalidate c" is now the head of queue 46. Also, prior to t3, "invalidate e" was received and stored in queue 46 in the entry following the entry corresponding to sync 1. At time t3, "invalidate f" is received and is stored in a subsequent entry of queue 46, following the entry corresponding to "invalidate e". Each of the entries corresponding to "invalidate e" and "invalidate f" have their valid flags asserted, but their sync flags and sync boundary flags negated. That is, queue 46 can continue to receive and store snoop requests prior to completion of a previous synchronization request (such as sync1). However, the sync flags and sync boundary flags of these subsequently received non-sync type snoop requests are not asserted to indicate participation in a synchronization operation.

FIG. 13 illustrates a portion of snoop request queue 46 at time t4. By time t4, note that "invalidate c" has been removed from the head of queue 46 to be processed (i.e. provided to cache 28 by arbiter 42). Therefore, "invalidate d" is now the head of queue 46. Also, prior to t4, "invalidate g" was received and stored in queue 46 (with its valid flag asserted) in the entry following the entry corresponding to "invalidate f" (since sync type requests are not stored in queue 46). At time t4, sync2 is received. However, unlike the example of FIG. 10, sync2 is not stored in an entry of queue 46. Instead, upon receipt of sync2, the sync boundary flag of the most recently queued snoop request ("invalidate g") is asserted (set to a logic level one) at the time sync2 is received. Also, the sync flag of all entries currently in existence in queue 46 at time t4 (which are not yet asserted) are asserted (set to a logic level one in this example). Therefore, all snoop requests in queue 46 which were received prior to sync2 have their sync flags asserted to indicate that they are participating in a sync operation. Note that the sync flags of "invalidate e" through "invalidate g" are set to indicate they are participating in a sync operation (for sync2). The sync flag of "invalidate d" remains asserted as well to indicate that it is also participating in a sync operation (for sync1, though). Note also, that in one embodiment, upon asserting the sync flags of these entries, the priority of these entries is elevated such that they are each, in turn, as they reach the head of queue 46, granted priority by arbiter 42 to access cache 28, even if there are pending access addresses from processing circuitry 40.

Therefore, when arbiter 42 grants priority to "invalidate d" to access cache 28, it can see that its sync boundary field is asserted, indicating that the processing of this current snoop request ("invalidate d") also indicates the completion of a sync operation (corresponding to sync1). Therefore, arbiter 42 (or snoop queue circuitry 44) can notify cache coherency manager 18 that the sync operation for sync1 has been completed, indicating that each of the requests in queue 46 prior to sync1 which participated in the sync operation (e.g. "invalidate a" through "invalidate d") have been completed. Snoop control 54 can then acknowledge completion of the sync1 request to cache coherency manager 18 using the encodings of FIG. 5. Furthermore, when arbiter 42 grants priority to "invalidate g" to access cache 28, it can see that its sync boundary field is asserted, indicating that the processing of this current snoop request ("invalidate g") also indicates the completion of a sync operation (corresponding to sync2). Therefore, arbiter 42 (or snoop queue circuitry 44) can notify cache coherency manager 18 that the sync operation for sync2 has been completed, indicating that each of the requests in queue 46 prior to sync2 which participated in the sync operation (e.g. "invalidate e" through "invalidate g") have been completed. Snoop control 54 can then acknowledge completion of the sync2 request to cache coherency manager 18 using the encodings of FIG. 5.

Note that in the example illustrated in FIG. 13, if the sync2 snoop request command was not received, then at the time that the snoop request "invalidate d" was removed from the queue and processed, then the next entry to reach the head of the snoop queue, "invalidate e", would not have its sync flag set, thus arbiter 42 would no longer elevate the priority of snoop request for "invalidate e", and arbitration would return to the normal arbitration policy employed by arbiter 42.

Therefore, it can now be understood how sync flags may be used within a snoop queue to help perform synchronization operations and priority elevation. Also, sync boundaries may additionally be used in order to prevent the need from even storing the sync-type snoop requests into queue 46, thus utilizing less entries of the snoop queue.

Because the various apparatus implementing the present invention are, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is implemented in a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. For example, any type of memory cache, synchronous or asynchronous, may be used. Various types of memory circuits including dynamic random access memory (DRAM), synchronous random access memory (SRAM), magnetoresistive random access memory (MRAM), FLASH, shift registers and addressable storage registers may be used to implement the cache. Various system interconnect or bus protocols could be implemented. In other embodiments system components in addition to those used in FIG. 1 may be provided. It should be understood that all circuitry described herein may be implemented either in silicon or another semiconductor material or alternatively by software code representation of silicon or another semiconductor material. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. Accordingly, the specification and figures are to be regarded in an illustrative rather than a restrictive sense, and all such modifications are intended to be included within the scope of the present invention.

The following are various embodiments of the present invention.

Item 1 includes a data processing system which includes a system interconnect; a plurality of bus masters, each bus master of the plurality of bus masters communicating information via the system interconnect; a cache associated with a predetermined bus master of the plurality of bus masters for storing information used by the predetermined bus master; and a snoop queue associated with the predetermined bus master. The snoop queue stores a plurality of snoop requests, and the snoop queue selectively stores for each snoop request an indicator of a synchronization request that indicates a synchronization operation is to be performed by completing any previously issued snoop requests prior to or concurrently with completion of the synchronization operation. The indicator includes a synchronization request indicator flag for each entry in the snoop queue that indicates whether each entry participates in the synchronization operation associated with the synchronization request. Item 2 includes the data processing system of item 1 where the snoop queue continues to receive and store snoop requests prior to completion of the synchronization operation, where the indicator of the synchronization request for each such snoop request is not being set to indicate participation in the synchronization operation. Item 3 includes the data processing system of item 1 and further includes an arbiter coupled to the predetermined bus master, the cache associated therewith, and the snoop queue, where the arbiter controls access to the cache and the arbiter changes priority of servicing of a next entry of the snoop queue to be processed in response to the synchronization request indicator flag of the next entry of the snoop queue to be processed. Item 4 includes the data processing system of item 3, where the arbiter elevates priority of servicing of the next entry of the snoop queue to be processed to be greater than a priority of the predetermined bus master in response to the synchronization request indicator flag of the next entry of the snoop queue to be processed. Item 5 includes the data processing system of item 1, where the snoop queue further includes a synchronization request boundary field within each snoop request, the synchronization request boundary field storing an indication of a synchronization request boundary, thereby avoiding utilizing an entry in the snoop queue to store a synchronization request. Item 6 includes the data processing system of item 5, where when a synchronization request boundary field of an entry in the snoop queue has a first predetermined value, the entry corresponds to a location in the snoop queue of a most recently queued snoop request at the time a synchronization request is received, the synchronization request boundary field of the entry in the snoop queue corresponding to the synchronization request boundary being set to the first predetermined value when the synchronization request is received. Item 7 includes the data processing system of item 6 and further includes control circuitry coupled to the snoop queue for controlling the processing of snoop queue requests and acknowledging completion of the synchronization request when a processed queue entry has its synchronization request boundary field asserted. Item 8 includes the data processing system of item 1 and further includes control circuitry coupled to the cache for indicating a presence of an error encountered when processing the synchronization operation. Item 9 includes the data processing system of item 8 where the control circuitry provides a snoop response that indicates a type of the error encountered when processing the synchronization operation. Item 10 includes the data processing system of item 9 where the type of the error indicated by the snoop response further includes at least one of an address tag error, a decoding error, a data error or a multiple cache hit error.

Item 11 includes a method which includes coupling a plurality of bus masters via a system interconnect bus, each bus master communicating information via the system interconnect bus; coupling a cache to a predetermined one of the plurality of bus masters; storing information used by the predetermined one of the plurality of bus masters in the cache; coupling a snoop queue to the cache; and storing a plurality of snoop requests in the snoop queue, the snoop queue selectively storing for each snoop request an indicator of a synchronization request that indicates a synchronization operation is to be performed by completing any previously issued snoop requests prior to or concurrently with completion of the synchronization operation, the indicator comprising a synchronization request indicator flag for each entry in the snoop queue that indicates whether each entry participates in the synchronization operation associated with the synchronization request. Item 12 includes the method of item 11 and further includes continuing to receive and store snoop requests in the snoop queue prior to completion of the synchronization operation, the indicator of the synchronization request for each such snoop request not being set to indicate participation in the synchronization operation. Item 13 includes the method of item 11 and further includes coupling an arbiter to the predetermined bus master, the cache associated therewith, and the snoop queue; controlling access to the cache from the predetermined bus master and the snoop queue; and changing priority of servicing of a next entry of the snoop queue to be processed in response to the synchronization request indicator flag of the next entry of the snoop queue to be processed. Item 14 includes the method of item 13 and further includes elevating priority of servicing of the next entry of the snoop queue to be processed to be greater than a priority of the predetermined bus master in response to the synchronization request indicator flag of the next entry of the snoop queue to be processed having a first value indicating said next entry participates in the synchronization operation associated with the synchronization request, and not elevating priority of servicing of said next entry of the snoop queue to be processed to be greater than a priority of the predetermined bus master in response to the synchronization request indicator flag of said next entry of the snoop queue to be processed having a second value indicating said next entry does not participate in the synchronization operation associated with the synchronization request. Item 15 includes the method of item 11 and further includes providing a synchronization request boundary field for each snoop queue entry, the synchronization request boundary field storing an indication of a synchronization request boundary, thereby avoiding utilizing entries in the snoop queue to store synchronization requests. Item 16 includes the method of item 11 and further includes controlling the processing of snoop queue requests and acknowledging completion of any synchronization requests when a processed queue entry has its synchronization request boundary field asserted.

Item 17 includes a data processing system which includes a system interconnect; a plurality of bus masters coupled to the system interconnect for communicating via the system interconnect, at least a predetermined one of the plurality of bus masters comprising a cache; an arbiter coupled to the predetermined one of the plurality of bus masters and the cache for arbitrating access to the cache; and a snoop queue and snoop control circuitry coupled to the cache and the arbiter. The snoop queue stores a plurality of snoop requests, each of the snoop requests having a synchronization request flag that becomes asserted upon receipt of a synchronization request, where the synchronization request flag indicates whether each entry participates in a synchronization operation associated with the synchronization request, and the arbiter elevates priority of the snoop queue for accesses to the cache in response to an entry at a head of the snoop queue having its synchronization request flag asserted. Item 18 includes the data processing system of item 17 where the snoop control circuitry provides an encoded snoop status signal that indicates if any error occurred during processing of the synchronization operation and what type of error occurred. Item 19 includes the data processing system of item 18 and further includes a synchronization request boundary field within each entry of the snoop queue, where the synchronization request boundary field stores an indication of a synchronization request boundary, thereby avoiding storing synchronization requests in the snoop queue. Item 20 includes the data processing system of item 17 where the snoop queue continues to receive and store snoop requests prior to completion of the synchronization operation, the synchronization request flag for each such snoop request not being set to indicate participation in the synchronization operation.

What is claimed is:

1. A data processing system comprising:
   a system interconnect;
   a plurality of bus masters, each bus master of the plurality of bus masters communicating information via the system interconnect;
   a cache associated with a predetermined bus master of the plurality of bus masters for storing information used by the predetermined bus master; and
   a snoop queue associated with the predetermined bus master, the snoop queue storing a plurality of snoop requests, the snoop queue selectively storing for each snoop request an indicator of a synchronization request that indicates a synchronization operation is to be performed by completing any previously issued snoop requests prior to or concurrently with completion of the synchronization operation, the indicator comprising a synchronization request indicator flag for each entry in the snoop queue that indicates whether each entry participates in the synchronization operation associated with the synchronization request.

2. The data processing system of claim 1 wherein the snoop queue continues to receive and store snoop requests prior to completion of the synchronization operation, the indicator of the synchronization request for each such snoop request not being set to indicate participation in the synchronization operation.

3. The data processing system of claim 1 further comprising:
   an arbiter coupled to the predetermined bus master, the cache associated therewith, and the snoop queue, the arbiter controlling access to the cache, the arbiter changing priority of servicing of a next entry of the snoop queue to be processed in response to the synchronization request indicator flag of the next entry of the snoop queue to be processed.

4. The data processing system of claim 3 wherein the arbiter elevates priority of servicing of the next entry of the snoop queue to be processed to be greater than a priority of the predetermined bus master in response to the synchronization request indicator flag of the next entry of the snoop queue to be processed.

5. The data processing system of claim 1 wherein the snoop queue further comprises:
   a synchronization request boundary field within each snoop request, the synchronization request boundary field storing an indication of a synchronization request boundary, thereby avoiding utilizing an entry in the snoop queue to store a synchronization request.

6. The data processing system of claim 5 wherein when a synchronization request boundary field of an entry in the snoop queue has a first predetermined value, the entry corresponds to a location in the snoop queue of a most recently queued snoop request at the time a synchronization request is received, the synchronization request boundary field of the entry in the snoop queue corresponding to the synchronization request boundary being set to the first predetermined value when the synchronization request is received.

7. The data processing system of claim 6 further comprising:
   control circuitry coupled to the snoop queue for controlling the processing of snoop queue requests and acknowledging completion of the synchronization request when a processed queue entry has its synchronization request boundary field asserted.

8. The data processing system of claim 1 further comprising:
   control circuitry coupled to the cache for indicating a presence of an error encountered when processing the synchronization operation.

9. The data processing system of claim 8 wherein the control circuitry provides a snoop response that indicates a type of the error encountered when processing the synchronization operation.

10. The data processing system of claim 9 wherein the type of the error indicated by the snoop response further comprises at least one of an address tag error, a decoding error, a data error or a multiple cache hit error.

11. A method comprising:
    coupling a plurality of bus masters via a system interconnect bus, each bus master communicating information via the system interconnect bus;
    coupling a cache to a predetermined one of the plurality of bus masters;
    storing information used by the predetermined one of the plurality of bus masters in the cache;
    coupling a snoop queue to the cache; and
    storing a plurality of snoop requests in the snoop queue, the snoop queue selectively storing for each snoop request an indicator of a synchronization request that indicates a synchronization operation is to be performed by completing any previously issued snoop requests prior to or concurrently with completion of the synchronization operation, the indicator comprising a synchronization request indicator flag for each entry in the snoop queue that indicates whether each entry participates in the synchronization operation associated with the synchronization request.

12. The method of claim 11 further comprising:
    continuing to receive and store snoop requests in the snoop queue prior to completion of the synchronization operation, the indicator of the synchronization request for each such snoop request not being set to indicate participation in the synchronization operation.

13. The method of claim 11 further comprising:
    coupling an arbiter to the predetermined bus master, the cache associated therewith, and the snoop queue;
    controlling access to the cache from the predetermined bus master and the snoop queue; and
    changing priority of servicing of a next entry of the snoop queue to be processed in response to the synchronization request indicator flag of the next entry of the snoop queue to be processed.

14. The method of claim 13 further comprising:
    elevating priority of servicing of the next entry of the snoop queue to be processed to be greater than a priority of the predetermined bus master in response to the synchronization request indicator flag of the next entry of the snoop queue to be processed having a first value indicating said next entry participates in the synchronization operation associated with the synchronization request, and not elevating priority of servicing of said next entry of the snoop queue to be processed to be greater than a priority of the predetermined bus master in response to the synchronization request indicator flag of said next entry of the snoop queue to be processed having a second value indicating said next entry does not participate in the synchronization operation associated with the synchronization request.

15. The method of claim 11 further comprising:
    providing a synchronization request boundary field for each snoop queue entry, the synchronization request boundary field storing an indication of a synchronization request boundary, thereby avoiding utilizing entries in the snoop queue to store synchronization requests.

16. The method of claim 11 further comprising:
controlling the processing of snoop queue requests and acknowledging completion of any synchronization requests when a processed queue entry has its synchronization request boundary field asserted.

17. A data processing system comprising:
a system interconnect;
a plurality of bus masters coupled to the system interconnect for communicating via the system interconnect, at least a predetermined one of the plurality of bus masters comprising a cache;
an arbiter coupled to the predetermined one of the plurality of bus masters and the cache for arbitrating access to the cache; and
a snoop queue and snoop control circuitry coupled to the cache and the arbiter, the snoop queue storing a plurality of snoop requests, each of the snoop requests having a synchronization request flag that becomes asserted upon receipt of a synchronization request, the synchronization request flag indicating whether each entry participates in a synchronization operation associated with the synchronization request, the arbiter elevating priority of the snoop queue for accesses to the cache in response to an entry at a head of the snoop queue having its synchronization request flag asserted.

18. The data processing system of claim 17 wherein the snoop control circuitry provides an encoded snoop status signal that indicates if any error occurred during processing of the synchronization operation and what type of error occurred.

19. The data processing system of claim 18 further comprising:
a synchronization request boundary field within each entry of the snoop queue, the synchronization request boundary field storing an indication of a synchronization request boundary, thereby avoiding storing synchronization requests in the snoop queue.

20. The data processing system of claim 17 wherein the snoop queue continues to receive and store snoop requests prior to completion of the synchronization operation, the synchronization request flag for each such snoop request not being set to indicate participation in the synchronization operation.

* * * * *